United States Patent [19]
Xu et al.

[11] Patent Number: 6,151,628
[45] Date of Patent: Nov. 21, 2000

[54] NETWORK ACCESS METHODS, INCLUDING DIRECT WIRELESS TO INTERNET ACCESS

[75] Inventors: Yingchun Xu, Buffalo Grove; Bennett S. Cardwell, Evanston, both of Ill.

[73] Assignee: 3Com Corporation, Santa Clara, Calif.

[21] Appl. No.: 08/887,313

[22] Filed: Jul. 3, 1997

[51] Int. Cl.[7] .................................................. G06F 13/00
[52] U.S. Cl. ........................................ 709/225; 713/201
[58] Field of Search ............................ 395/187.01, 182, 395/188.01, 200.5, 200.53, 200.54, 200.55, 200.57, 200.8; 379/60; 370/401, 338, 349, 389, 400, 907, 908, 913; 713/201, 202; 709/220, 223–225, 227, 229, 250

[56] References Cited

U.S. PATENT DOCUMENTS

| | | |
|---|---|---|
| 4,991,169 | 2/1991 | Davis et al. . |
| 5,325,419 | 6/1994 | Connolly et al. ........................ 379/60 |
| 5,339,316 | 8/1994 | Diepstraten ........................ 370/85.13 |
| 5,371,738 | 12/1994 | Moelard et al. ...................... 370/85.1 |
| 5,418,842 | 5/1995 | Cooper . |
| 5,519,704 | 5/1996 | Farinacci et al. . |
| 5,528,595 | 6/1996 | Walsh et al. . |
| 5,577,105 | 11/1996 | Baum et al. . |
| 5,588,003 | 12/1996 | Ohba et al. ........................... 370/468 |
| 5,761,309 | 6/1998 | Ohashi et al. ........................... 380/25 |
| 5,790,548 | 6/1998 | Sistanizadeh et al. ................. 370/400 |
| 5,841,970 | 11/1998 | Tabuki ................................... 713/201 |
| 5,878,127 | 3/1999 | Fleischer ................................ 379/220 |

FOREIGN PATENT DOCUMENTS

| | | |
|---|---|---|
| 0762261 | 3/1997 | European Pat. Off. . |
| WO9508900 | 3/1995 | WIPO . |

OTHER PUBLICATIONS

Varma, V.K., et al: "Architecture for Interworking Data Over PCS", Ieee Communications Magazine, vol. 34, No. 9, Sep. 1996, pp. 124–130.

Kylaenpaeae, M., et al: "Nomadic Access to Information Services by a GSM Phone", Compuers and Graphics, vol. 20, No. 5, Sep. 1, 1996, pp. 651–658.

Perkins, C, et al: "IMHP: A mobile host protocol for the Internet", Computer Networks and ISDN Systems, vol. 27, No. 3, Dec. 1994, p. 479–491.

Search Report for PCT/US 98/13858, Dated Nov. 23, 1998.
International Engineering Task Force RFC 2005, "Applicability Statement for IP Mobility Support", Oct. 1996 (J. Solomon).

International Engineering Task Force RFC 2004, "Minimal Encapsulation Within IP", Oct. 1996 (C. Perkins).
International Engineering Task Force RFC 1853, "IP in IP Tunneling", Oct. 1995 (W. Simpson).

(List continued on next page.)

*Primary Examiner*—Thomas M. Heckler
*Attorney, Agent, or Firm*—McDonnell Boehnen Hulbert & Berghoff

[57] ABSTRACT

A method is provided for connecting a source of digital data to a computer network. The source of digital data transmits data over a wireless transmission medium to a wireless service carrier, the wireless service carrier multiplexing the digital data onto a high speed digital telephone line. The method comprises the steps of receiving the digital data at a communications chassis such as a network access server, extracting, from the digital data, network access authentication data comprising at least one of the following: (a) a telephone number called by the source of digital data, or (b) a telephone number associated with the source of digital data; transmitting the authentication data over a local area or wide area computer network connected to a network authentication server for the computer network; determining, in the network authentication server, from the transmitted authentication data whether the remote user is permitted to access the computer network; and the authentication server responsively notifying the network access server the results of the step of determining; and authorizing the source of data to access the computer network if the step of determining results in a positive response.

18 Claims, 10 Drawing Sheets

OTHER PUBLICATIONS

International Engineering Task Force RFC 854, "Telnet Protocol Specification", May 1983 (J. Postel et al.).

International Engineering Task Force RFC 2059, "Radius Accounting", Jan. 1997 (C. Rigney).

International Engineering Task Force RFC 1701, "Generic Routing Encapsulation (GRE)", Oct. 1994 (S. Hanks et al.).

International Engineering Task Force RFC 822, "Standard for the Format of ARPA Internet Text Message", Aug. 1982 (David H. Crocker).

International Engineering Task Force RFC 2058, "Remote Authentication Dial in User Service (RADIUS)", Jan. 1997 (C. Rigney et al.).

Draft International Engineering Task Force, "Point–to–Point Tunneling Protocol—PPTP", Jun. 1996 (Kory Hamzeh et al.).

FIG. 7　TELNET TUNNELING CALL ACCEPT

NETWORK ACCESS METHODS, INCLUDING DIRECT WIRELESS TO INTERNET ACCESS

BACKGROUND OF THE INVENTION

A. Field of the Invention

This invention relates to the field of data communication and more particularly to a method of connecting a wireless user generating digital data (for example, a computer having a cellular telephone modem) to a computer network, such as a corporate backbone LAN or the Internet.

B. Description of Related Art

Network access servers that provide local or wide area network access for remote users dialing in over the public switched telephone network are known in the art. These devices are available from 3COM Corporation (previously from U.S. Robotics Access Corp.), the assignee of the present invention. The Total Control Network Enterprise Hub from 3COM is a representative network access server. It is described in U.S. Pat. No. 5,577,105 of Baum et al., entitled "Telephone Call Switching and Routing Techniques for Data Communications," and U.S. Pat. No. 5,528,595 of Walsh et al., entitled "Modem Input/Output Signal Processing Techniques." The Walsh et al. and Baum et al. patents are both fully incorporated by reference herein.

The network access server described in the Walsh et al. and Baum et al. patents provides an interface to a multiplexed digital telephone line, a plurality of modems for performing signal conversions for the data from the remote users, and a network interface for transmitting demodulated data from the modems onto a local or wide area network. A high speed midplane bus structure comprising a time division multiplexed bus provides a signal path between the channels of the telephone line and the modems. The high speed midplane also includes a parallel bus that couples the modems to the network interface.

This network access server architecture in a single chassis has proven to be very popular in a variety of applications, particularly corporate network access. The network access server is also particularly popular with Internet service providers for land-based Internet users. With a single network access server, the Internet service provider can handle a large number of simultaneous Internet access calls and provide full duplex communication between the multiple remote users and host computers on the Internet.

The technology for Internet access for wireless users is now emerging. There are two competing standards for wireless service, CDMA (Code Division Multiple Access, described in the standards documents IS-130 and IS-135, incorporated by reference herein) and TDMA (Time Division Multiple Access, described in standards document IS-99, also incorporated by reference herein). These standards specify a feature rich sets of digital wireless communications, for both voice and data. The two standards differ in how digital data from multiple users are multiplexed on the radio interface.

In accordance with both wireless technologies, a wireless user transmits data to a mobile switching center. The mobile switching center provides connectivity to the public switched telephone network, certain multiplexing and control functions, and switching functions for the mobile users. Multiplexed digital data from a plurality of remote wireless users is then capable of being transmitted via high speed communication formats (such as Frame Relay) to communication elements in the public switched telephone network.

The present invention provides for network access methods and apparatus that are particularly suitable for wireless users. The present invention also provides for network access methods by which a network access server, in combination with one or more authentication servers, can provide for Internet and corporate network authentication and access. The network access server provides for the functions needed for terminal equipment connected to a TDMA or CDMA mobile telephone to inter-work with terminal equipment connected to the public switched telephone network (PSTN) and the Internet. Further, the invention provides for Internet access methods for a plurality of remote users that are subscribers of more than one Internet service provider, thereby giving more flexibility in the ability of a particular Internet service provider to serve diverse Internet users.

SUMMARY OF THE INVENTION

A method is provided for connecting a source of digital data to a computer network, the source of digital data generating digital data and communicating over a wireless transmission medium to a wireless service carrier. The wireless service carrier multiplexes the digital data onto a high speed digital telephone line for transmission to a communications chassis or server providing network access. The method comprises the steps of receiving the digital data at the communications chassis and extracting, from the digital data, network access authentication data comprising at least one of the following: (a) a telephone number called by the source of digital data, or (b) a telephone number associated with the source of digital data. The communications chassis transmits the authentication data over a local area or wide area computer network connected to the network access server to a network authentication server for the computer network. The network authentication server determines from the transmitted authentication data whether the remote user is permitted to access the computer network. The authentication server responsively notifies the network access server the results of the step of determining. The remote user is authorizes to access the computer network if the step of determining results in a positive response.

The method may also comprise the further step of identifying a tunneling server linked via a local area or wide area network to the communications chassis to be used to provide access for the source of digital data to the computer network, and routing digital data from the source to the tunneling server to provide the access to the computer network. The identification of the tunneling server is determined from the authentication data from the remote user, such the remote user's phone number or the dialed number. In this embodiment, the invention may also be practiced by determining, in the authentication server, a tunneling protocol for the source of digital data for use in tunneling digital data between the communications device and the tunneling server. This step of determining may be practiced, for example, by looking in a software look up table the tunneling server and required protocol associated with the remote user (identified, for example by the remote user's telephone number). The digital data is routed via the tunneling server in accordance with the tunneling protocol. Either PPTP or TELNET protocols will be used in accordance with a preferred embodiment of the invention.

A second phase of access authentication may be optionally provided, comprising a password authentication routine that takes place between the remote user and the authentication server or the tunneling server.

A principal object of the invention is thus to provide direct access to the Internet and other computer networks for remote users such as wireless users. This, and other objects of the invention will be more apparent from the following detailed description.

BRIEF DESCRIPTION OF THE DRAWINGS

Presently preferred embodiments of the invention will be described in conjunction with the drawings, in which like reference numerals refer to like elements in the various views, and in which.

DETAILED DESCRIPTION OF THE PREFERRED EMBODIMENT

Figure 1:
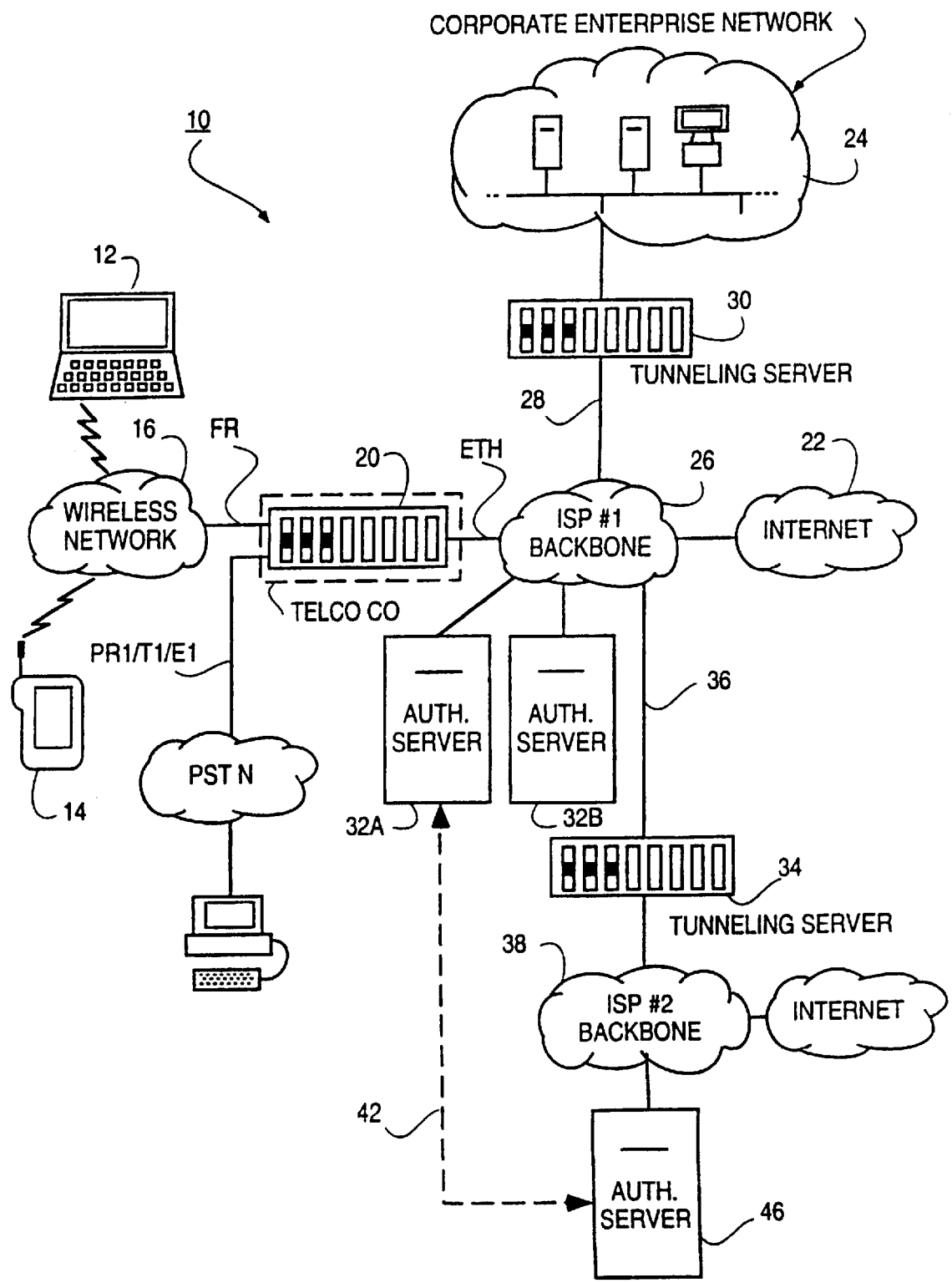
FIG. 1 is an illustration of an example of a preferred network access system for wireless users in accordance with an embodiment of the invention.

FIG. 1 is an illustration of a preferred network access system 10 for users of wireless equipment 12, 14 that can be used to practice the invention. Remote devices such as a laptop computer 12 with a wireless modem or a wireless personal data assistant (PDA) 14 communicate via wireless modem to a wireless digital communications network 16 in accordance with the TDMA (Time Division Multiple Access) or the CDMA (Code Division Multiple Access) standards.

The wireless network 16 includes a Mobile Switching Center (MSC) (not shown), which is an element within the wireless telecommunications network 16 that provides public switched telephone network connectivity, control functions and switching functions for the wireless users. In the embodiment of FIG. 1, the MSC places data from the remote wireless users onto a high speed digital frame relay line FR for transmission to a communications chassis 20 in the local calling area. In a preferred embodiment, the communications chassis 20 comprises an integrated network access server such as the Total Control Network Enterprise Hub of 3Com Corporation (formerly from U.S. Robotics), modified to interface with the frame relay line FR and perform tunneling, authentication and accounting functions as described below.

The communications chassis 20 functions as a gateway between the CDMA/TDMA wireless network 16 and an Internet service provider (ISP) backbone network 26, the Internet 22, or other computer network such as a corporate or private LAN/WAN 24 via an Ethernet or other local area network ETH and the Internet service provider backbone network 26. The chassis 20 provides the functions needed for terminal equipment connected to a CDMA or TDMA mobile phone to intercommunicate with terminal equipment connected to the PSTN and Internet networks. In one possible and presently preferred embodiment, the communications chassis 20 is installed at the telephone company central office (TELCO CO) and managed by an Internet Service Provider (ISP). The chassis 20 receives calls from wireless users 12, 14 via the MSC in the wireless network 16 as local calls on the line FR.

The wireless terminals 12, 14 access the corporate/private network 24 using a tunneling protocol over LAN or WAN line 28 between the communications chassis 20 and a tunneling server 30. The tunneling server is connected to a corporate/private network 24 and is connected via a backbone network 26 connected to the communications chassis 20. In a preferred embodiment, the tunneling is according to a Point-to-Point Tunneling Protocol (PPTP) described in the PPTPRFC (June 1996), a publicly available Request for Comments document, which is incorporated by reference herein. The tunneling could of course be in accordance with other emerging and equivalent protocols, such as L2TP. Since PPTP and L2TP are not designed to support non-PPP (Point-to-Point) Asynchronous protocol, the TELNET protocol is used to tunneling non-PPP asynchronous traffic over line 28. The tunneling server is also preferably an integrated network access server such as the Total Control Enterprise Network Hub or the equivalent.

With this architecture, it is possible to divorce the location of the initial dial-up server (communications chassis 20) from the location at which the intermediate network terminates the dial-up protocol connection (PPP) and provides access to the target network 22 or 24 at the tunneling server 30. In addition to supporting the Internet 22 as the target network, this architecture also supports access to virtual private networks, allowing the remote wireless user to gain secure access to their corporate or private network such as the corporate enterprise network 24 illustrated in FIG. 1.

The architecture also allows the Internet Service Provider operating the local communications chassis 20 at the central office to provide Internet access for not only the ISP's customers, but also customers of other Internet service providers. This is achieved by use of one or more authentication servers 32A, 32B connected to the Internet service provider's backbone network 26. The authentication servers 32A, 32B perform authentication and access authorization for the first ISP's customers. A second tunneling server 34 is connected via a dedicated line 36 (or LAN or WAN) or otherwise to a second ISP's backbone network 38. In this embodiment, the authentication server 32A has a profile of its customer base for the first ISP managing the communications chassis 20 and can determine, using a variety of simple techniques (discussed below) whether the remote user dialing into the communications device 20 is allowed to access the Internet 22 via the ISP's backbone 26. If access is allowed (due to the call originating from one of the first Internet service provider customers), the call is routed through the network 22 to the Internet. If not, other procedures, described below, can be initiated.

The present invention takes advantage of the fact that the call from the remote user 12 contains information identifying the telephone number of the call originator, and the telephone number that is dialed. This information is used as a first stage authentication mechanism. When the authentication server 32A performs the first phase authentication and determines that the remote user is not one of the first Internet service provider's customers (due to, for example, the telephone number not matching up to a table of customer phone numbers), but rather is a customer of a second Internet service provider, the authentication server 32A directs the authentication request to a second authentication server 40 connected to the second Internet service provider's backbone 38, and the first phase authentication can take place. This communication is facilitated by providing a dedicated line 42 (e.g., leased line, POTS line, etc.) between the authentication server 32A and the authentication server 40 managed by a second Internet service provider.

If the authentication results in a positive response, the authentication server 40 notifies authentication server 32A of the result and the remote wireless user 12 is either given Internet 22 access over network 26 or via tunneling server 34, or an optional second phase pass-word type authentication may take place between the remote user 12 and the second authentication server 40.

These combination of features allow the ISP or other entity managing the communications chassis 20 and authentication server 32A the ability to significantly increase the features it provides to its customers. It also allows the ISP to provide Internet access for other Internet service providers, and in the process presumably generate revenue for such services. For the wireless users, the Internet or corporate network access is a matter of a local call through the wireless network 16 to the communications device 20.

In a preferred form of the invention, the communications chassis 20 is a robust communications platform such as the Total Control Enterprise Network Hub incorporating an integral general purpose computing platform, i.e., the EdgeServer™ card commercially available from 3COM. This product allows the communications chassis to run a commercially available stand alone operating system, such as WINDOWS NT™ from Microsoft Corporation, as well as other remote access software products such as RADIUS (Remote Authentication Dial In User Service). In the above-described Internet access methods, the accounting and authentication functions are preferably employed using the RADIUS protocol, which is a widely known protocol described in Request for Comments (RFC) 2058, January 1997, which is incorporated by reference herein, or other commercially available or known accounting software programs.

In accordance with a preferred embodiment of the invention, two phases of authentication are implemented in order to control access to the Internet 22 or corporate/private network 24 to those wireless users that are permitted access via network 26. The first phase of authentication is based on the called number dialed by the remote user 12, 14 and the calling number of the wireless user 12, 14 (the user's phone number associated with the computer 12 or PDA 14). The second phase of the authentication is based on a test user name and password authentication protocol (for PPP and TELNET tunneling) or Challenge/Response protocol (for PPP tunneling only). These authentication procedures are described in further detail below.

Still referring to FIG. 1, the communications device 20 also preferably supports non-tunneling Internet 22 access directly from an Internet interface in the communications device. With this feature, the communications device performs both phases of authentication, termination of the PPP protocol, and routes Internet Protocol traffic.

One other possible embodiment of the invention is a scenario in which the communications device 20 provides direct PSTN (Public Switched Telephone Network) connectivity for mobile or land originated data calls. In this scenario, the communications chassis 20, such as the Total Control Network Enterprise Hub described previously, contains the required modems and telephone line interface and processing circuitry to perform these functions. This embodiment would be a particularly advantageous in the case where the Internet service provider is also the local telephone company. With the present Internet access invention, the communications device 20 will extract or screen the called number in the ATD command issued by the mobile data user during a mobile originated data call. For most called numbers, the communications device 20 processes the call as a standard PSTN modem call. However, if the called number is associated with Internet access, the communications chassis 20 will perform the first phase of authentication with an authentication server 32A associated with the called number (either on the ISP's backbone network 26 or connected via dedicated line 36, 42 or other network to the communications chassis 20). The authentication server 32A determines whether the remote user is authorized to access the Internet 22 or network 24 serviced by the authentication server 32A.

Figure 2:
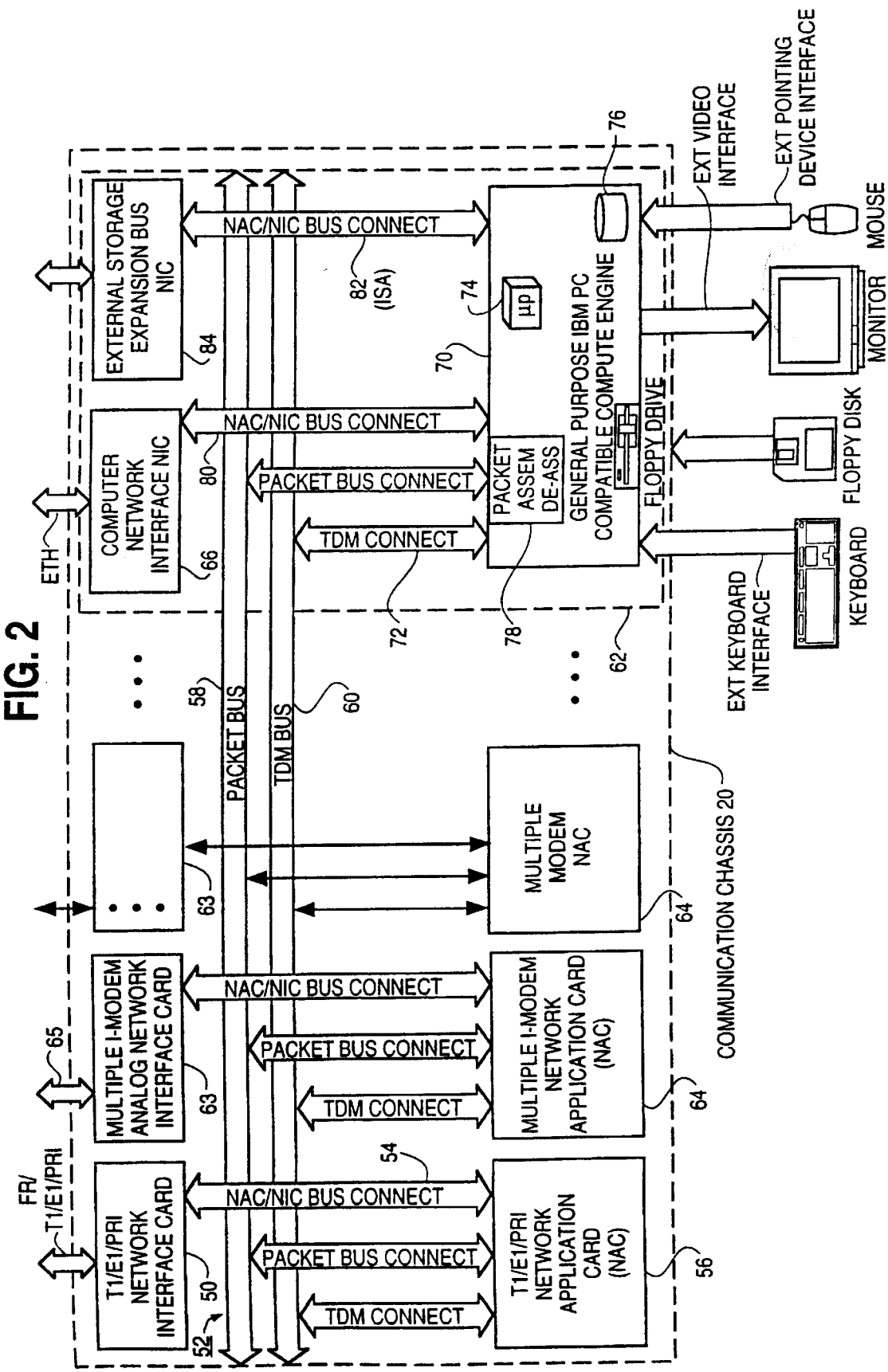
FIG. 2 is a simplified functional block diagram of a preferred form of the communications chassis of FIG. 1 that can service not only wireless users but also users dialing in over the public switched telephone network.

FIG. 2 is a simplified functional block diagram of a preferred form of the communications chassis or network access server 20 of FIG. 1 that can service not only wireless users but also users dialing in over the public switched telephone network. As such, the chassis contains features that are not required to practice the invention, and which perform additional functions due to a particular embodiment of the invention in which PSTN connectivity is also enabled. The network access server 20 shown in FIG. 2 is essentially the architecture and design of the current model of the Total Control Network Enterprise Hub, the commercially available product of the applicant's assignee. It will be understood that integrated access servers of other manufacturers in the industry can be modified as needed to provide the features of the present invention, and the invention should not be considered limited to the particular preferred embodiment described herein.

The network access server 20 includes the telephone network interface card 50 connected to time division multiplexed digital telephone lines such as T1, E1 and ISDN Primary Rate Interface (PRI) lines as well as a frame relay line. The network interface card receives digital data from the wireless remote users via the wireless service switch on the Frame Relay line FR. The interface card 50 has connectors that physically receive the telephone lines, and a CSU line interface unit to recover clock signals and data from the incoming signals and perform multiplexing and demultiplexing functions for outgoing and incoming data streams to place the calls into the time slots of the carrier. The card 50 transmits the incoming telephone signals via a NIC/NAC (network interface card/network application card) bus 54 to a T1/E1/ISDN PRI/network application card 56. The application card 56 provides framing for the recovered telephone line data to extract the Frame Relay time division multiplexed data, T1 DS0 channel data, or ISDN 2B+D channel data incorporated into the ISDN PRI signal, and then switches with a time/space switch the channel data to time slots on a time division multiplexed bus 60 that is part of an internal chassis bus midplane 52.

Where the incoming call is from the wireless service central office and arrives at the server on the Frame Relay line, the channel data does not need any signal conversion processing ordinarily performed in a modem and is routed over the TDM bus 60 to the routing and LAN/WAN interface card 62. In the Total Control Enterprise Network Hub, this card 62 is known as the "EdgeServer"™ card, and competing network access devices from Ascend, Livingston and other manufacturers have analogous interfaces. The "EdgeServer"™ card 62 has a pair of Munichs chips that assemble packets of data in accordance with TCP/IP protocol for transmission to the destination directly via the LAN/WAN interface or via a tunneling server.

For calls that are originating from users connected to the public switched telephone network and signal transformations are required, the TDM bus 60 directs the calls to modems in multiple modem modules or cards 64. The internal chassis bus 52 further includes a high speed parallel packet bus 58 connecting the modems in the cards 64 to the EdgeServer™ card 62 for transmission of the data after demodulation/signal conversion to the routing engine in the EdgeServer card 62. A plurality of analog network interface cards 63 for connecting the modems up to a serial interface 65 are also provided.

The telephone line interface and application cards 50 and 56, respectively, modem cards 63 and 64, internal chassis buses complex 52 (including TDM and parallel buses 60 and 58, respectively), and computer network interface 66 of the EdgeServer™ card 62 are described in great detail in terms of their component circuitry and operation in the above-referenced U.S. Pat. No. 5,577,105 of Baum et al., entitled "Telephone Call Switching and Routing Techniques for Data Communications," and U.S. Pat. No. 5,528,595 of Walsh et al., entitled "Modem Input/Output Signal Processing Techniques". The detailed structure of a preferred internal chassis bus is described in U.S. Pat. No. 5,416,776 to Panzarella et al., entitled "Modem Backplane Techniques", also assigned to 3COM Corporation, which is incorporated by reference herein. The management of a chassis by a management card is also described in detail in U.S. Pat. No. 5,436,614 to Panzarella et al., entitled "Modem Management Techniques," which is also assigned to 3COM Corporation and incorporated by reference herein. These elements are also described in the publicly available operators manual for the Total Control Network Enterprise Hub product, which is also incorporated by reference herein.

The EdgeServer™ card 62 contains a general purpose computing platform 70 running commercially available stand-alone or share ware operating system (such as WINDOWS NT™). The card 62 is described in more detail in the pending patent application William Verthein et al., Ser. No. 08/813,173, which is incorporated by reference herein.

Since the details of the telephone line interface and application cards, modem cards, management cards (not shown) and computer network interface 66 of the card 62 exist in publicly available products, are already described elsewhere in publicly available documents, and persons skilled in the art already know how to build and design such circuits (or equivalent circuits), a detailed discussion of these components of the communication access chassis 10 is not necessary. Additionally, the details as to the architecture or design of the communication chassis 10 is not particularly important.

The EdgeServer card 62 includes a TDM interface 72 that receives channel data from the frame relay FR line via the TDM bus 60. The computing platform 70 consists of an off-the shelf IBM compatible personal computer with a integral central processing unit 74, and peripheral interfaces for a keyboard, floppy disk, monitor and mouse. The computing platform also includes an internal storage hard disk drive 76. The computing platform also includes packet assembly and disassembly circuitry 78 that assembles packets of data from the modems in the modem modules 64 into formats suitable for use by the general purpose computing platform 70. The general purpose computing platform communicates with a conventional network interface 66 via a NIC/NAC bus connect 80. The computing platform also communicates via a second ISA bus 82 to an external storage expansion bus interface 84, which is connected to external disk drives or other suitable storage devices to increase the memory capacity of the communications chassis 20. In a preferred embodiment, the software for running tunneling and authentication functions described below in the communications chassis 20 is loaded in the general purpose computing platform 70 in the EdgeServer™ card 62.

Figure 2A:
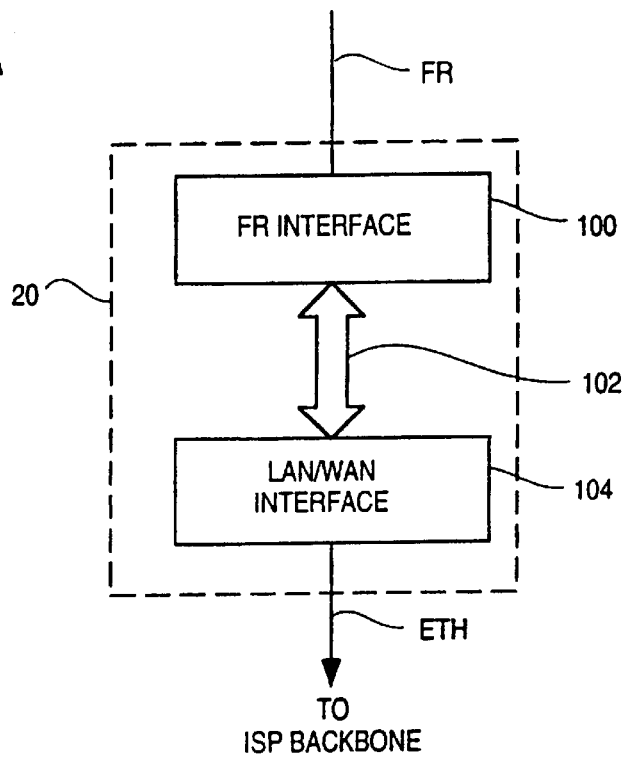
FIG. 2A is a simplified block diagram of a communications chassis suitable in an embodiment in which analog modem calls are not supported.

As noted above, the architecture and features provided by the communications chassis of FIG. 2 provides more features than will ordinarily be necessary to interconnect the remote users on the wireless network to the ISP backbone, corporate network or Internet. FIG. 2A is simplified schematic diagram of an alternative device without modems which would be suitable for an embodiment in which PSTN termination functions are not provided for the communications device. In the embodiment of FIG. 2A, a frame relay interface 100 comprising line interface unit, demultiplexing circuitry and framing circuitry is provided in one module. The interface 100 places channel data on time slots in a TDM bus complex 102 which connects the interface 100 with a LAN/WAN interface 104. The LAN/WAN interface 104 preferably consists of an off-the-shelf Ethernet or other standard interface modified with a general purpose computing platform loaded with software to perform the call routing, authentication, tunneling and other features described herein.

With the above FIGS. 1 and 2 and 2A in mind, it will be appreciated that a method of connecting a source 12 of digital data to a computer network 24, 22 (e.g., corporate private network, Internet, World Wide Web, etc.) is provided. The source of digital data 12 generates digital data and communicates over a wireless transmission medium to a wireless service carrier. The carrier multiplexes the digital data onto a high speed digital telephone line, e.g., line FR. The method comprises the steps of (1) receiving the digital data at a network access server or communications chassis 20 and extracting, from the digital data, network access authentication data comprising at least one of the following: (a) a telephone number called by the source 12 of digital data, or (b) a telephone number associated with source of digital data;

(2) transmitting the authentication data over a local area or wide area computer network connected to the communications device 20 to a network authentication server 32A or 32B for the computer network 24 or 22, the network authentication server linked via the local area or wide area computer network 26 to the communications chassis 20; and (3) determining, in the authentication server 32A, from the transmitted authentication data whether the remote user is permitted to access the computer network 22 or 24. The authentication server 32A responsively notifies the communications chassis 20 the results of said step of determining and authorizes the source 12 of data to access the computer network 24 or 22 if the step of determining results in a positive response.

The method may also comprise the further step of identifying a tunneling server 30 or 34 linked via a local area or wide area network 26 to the communications chassis 20 to be used to provide access for the source 12 of digital data to the computer network, and routing digital data from the source 12 of digital data to the tunneling server 30 to provide the access to the computer network 24. The identification of the tunneling server is determined, in a preferred embodiment, by the authentication data extracted from the incoming call (i.e., the dialed number and the dialing number). In this embodiment, the invention may also be practiced by determining, in the authentication server 32A or 32B, a tunneling protocol for the source 12 of digital data for use in tunneling digital data between the communications device 20 and the tunneling server 30. This step of determining may be practiced, for example, by looking in a software look up table the tunneling server and required protocol associated with the remote user 12 (identified by the remote user 12 telephone number). The digital data is routed via the tunneling server in accordance with the tunneling protocol. Either PPTP or TELNET protocols will be used in accordance with a preferred embodiment of the invention.

In a preferred embodiment, communications chassis 20 of FIG. 2 also provides access to the public switched telephone network via the T1/E1/ISDN interface 50/56. The communications chassis 20 routes digital data to a destination for the digital data from the remote user 12. In this fashion, the communications chassis 20 provides not only direct network access to computer networks 22 and 24 but also provides signal modulation via modems in the chassis to allow the call to transmitted via the telephone network to a remote terminal such as computer 13 in FIG. 1. The manner in which the communications chassis 20 provides PSTN connectivity is known in the art and described in the above-cited Walsh et al. patent.

In a preferred network access embodiment of the invention, a second phase authentication routine is employed to verify that the remote user is authorized to access the designated network. This is a accomplished by conducting a password authentication procedure such PAP or CHAP routine, both of which are known in the art, between either (1) the tunneling server 30 or (2) the authentication server 32A and the remote user, or (3) between authentication server 32A and tunneling server 30/34, thereby providing a second level of authentication.

In one specific embodiment of the invention, an Internet access method is provided for use by an Internet service provider having a network access server or communications chassis 20 receiving telephone calls from a user 12 over a high speed telephone line, comprising the steps of:

(1) connecting the network access server 20 to an authentication server (e.g., 32A or 32B) over a local or wide area network 26;

(2) extracting, from an incoming call from the user 12, network access authentication data comprising at least one of the following: (a) a telephone number called by the user, or (b) a telephone number associated with the user;

(3) routing the network authentication data extracted from the incoming call to the authentication server 32A or 32B for authentication of the user from the network access authentication data;

(4) identifying a tunneling server (e.g. 34) for providing network access for the user and notifying the communications chassis 20 of the tunneling server; and (5) tunneling digital data from the communications chassis 20 to the tunneling server 34; and (6) placing said digital data onto the Internet by said tunneling server.

In a preferred embodiment, the method is accompanied by a process of identifying a tunneling protocol for the user for step of tunneling. For example, the authentication server 32A or 32 B or 40 may associate the user with a particular tunneling protocol (PPTP or TELNET) by the characteristics of the remote user, the requirements of the designated tunneling server, or otherwise. Such information would typically be stored in the memory at the authentication server 32A.

Further, the invention contemplates an Internet Service Provider system for wireless Internet users, comprising a network access server 20 (FIG. 2) comprising (1) a high speed digital telephone line FR interface receiving calls from the wireless Internet user, and an Internet gateway (e.g. WAN interface 66 in FIG. 2) for placing digital data associated with said wireless Internet user onto the Internet;

(2) an Internet access authentication server (e.g., 32A) linked to the network access server 20 via a communications medium 26 and responsive to Internet access authentication data extracted from the digital data associated with the wireless Internet user; and (3) the authentication server 32A further comprising a memory for determining from the Internet access authentication data whether the wireless Internet user 12 is authorized to access the Internet, the Internet authentication server responsively passing an authentication response to the network access server 20. The network access server 20 is responsive to the authentication response from the authentication server to either allow the wireless Internet user to access the Internet or to take other action with respect to a call from the wireless Internet user. For example, the Internet service provider may forward an authentication inquiry to another authentication server (e.g., 40 in FIG. 1) administered by a second Internet service provider and see if the user a customer of the second Internet service provider.

Further details concerning the implementation of presently preferred embodiments of the invention will be discussed with reference to FIGS. 3–11.

Figure 3:
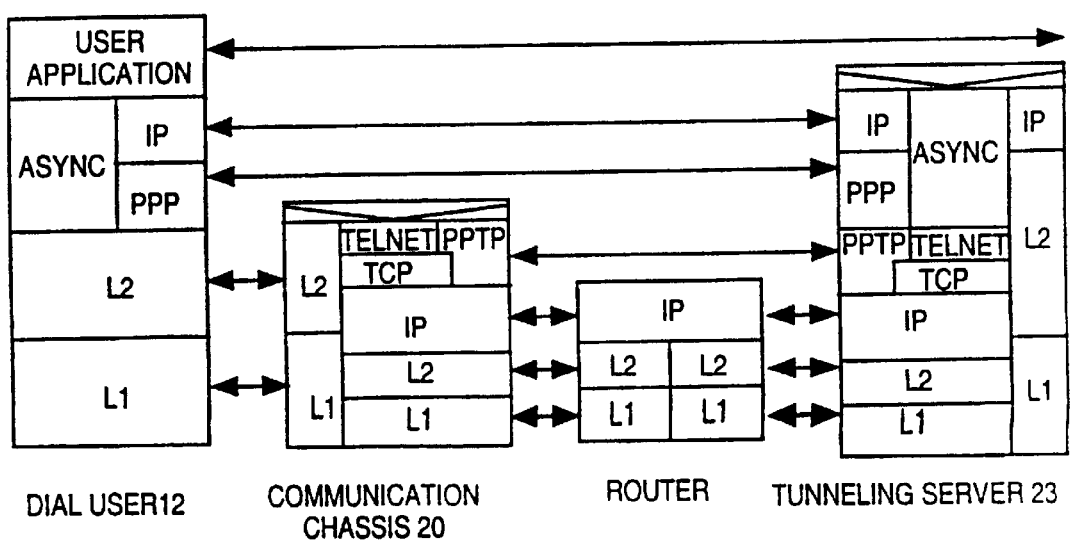
FIG. 3 is an illustration of the protocol stacks for the tunnel interface between the remote user and the tunneling server of FIG. 1.

FIG. 3 is an illustration of the protocol stacks and architecture for the tunnel interface between the remote user 12, the communications chassis 20, a router (not shown) in the Internet service provider backbone network 26, and the designated tunneling server 30 or 34 of FIG. 1. In FIG. 3, the legends L1 and L2 indicate lower level protocols (such as the data link layer). IP indicates the Internet Protocol. PPP indicates the Point-To-Point Protocol. TCP indicates the transmission control protocol. The term Async indicates an asynchronous protocol that may be associated with the remote user 12 and the TELNET protocol is used in the communications chassis 20 and the tunneling server for asynchronous communications. It can be seen that the communications chassis 20 communicates with the tunneling serer either using PPTP or TELNET running over the IP and lower level protocols.

Figure 4:
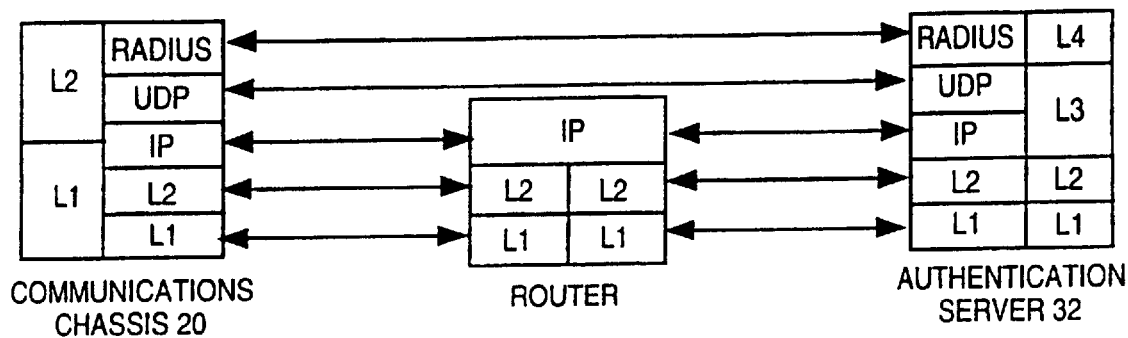
FIG. 4 is an illustration of the protocol stacks for authentication and accounting interface between the communications chassis and the authentication server of FIG. 1.

The communications chassis 20 communicates with an authentication server (e.g., 32A) running RADIUS to implement authentication and accounting through the UDP/IP protocol stack, as shown in FIG. 4. FIG. 4 is an illustration of the protocol stacks for authentication and accounting interface between the network access server or communications chassis 20 and the authentication server 32A of FIG. 1. UDP is a connection-less oriented protocol built on top of the Internet Protocol (IP).

Figure 5:
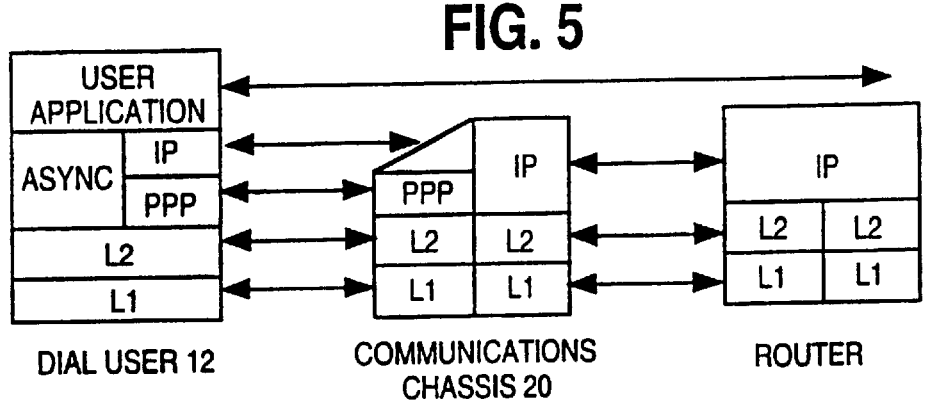
FIG. 5 is an illustration of the protocol stacks for a non-tunneling interface between the remote dial user and the router connecting the user with a destination terminal equipment.

When the communications chassis 20 communicates with the Internet 22, there is no tunneling protocol. FIG. 5 is an illustration of the protocol stacks for a non-tunneling interface between the remote dial user and the router connecting the user with a destination terminal equipment.

Figure 6:
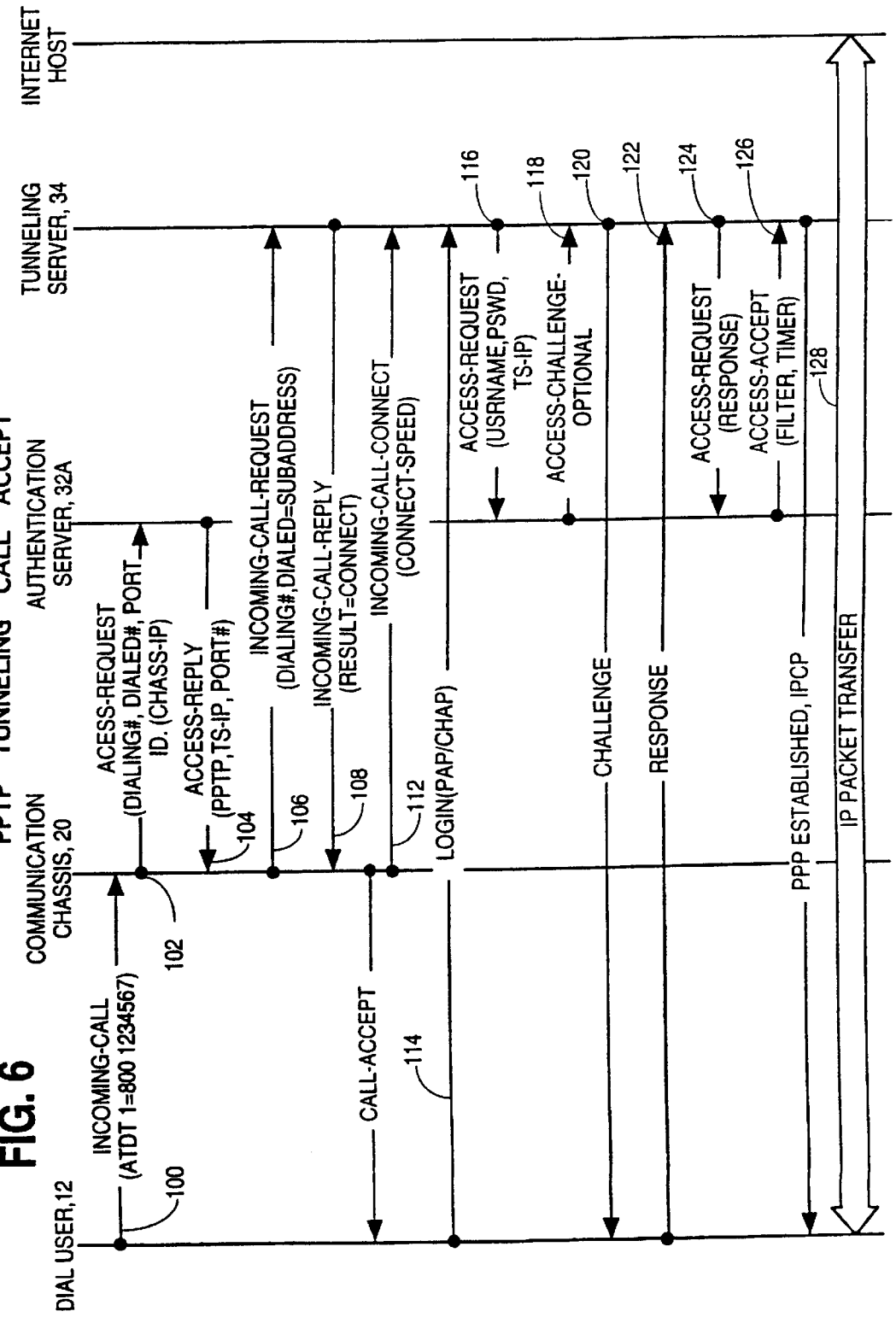
FIG. 6 is a diagram of the call flow for PPTP protocol tunneling for a call acceptance scenario in accordance with a preferred embodiment of the invention.

FIG. 6 is a diagram of the call flow for PPTP protocol tunneling for a call acceptance scenario in accordance with a preferred embodiment of the invention. In FIG. 6, the process starts with an incoming call at step 100. The call is associated with a particular destination telephone number (1-800-123-4567 in the illustrated example).

At step 102, the communications chassis initiates an first phase authorization access routine with an authentication server (e.g., 32A or 32B) connected to the communications chassis over a local area network. This authentication request is a software structure that is forwarded to the authentication server that includes fields for the following information: (1) the telephone number associated with the remote user (which is detected during the incoming call in accordance with known caller identification techniques or in the manner described in the above-cited Baum et al. patent); (2) the telephone number dialed, e.g., 1-800-123-4567, again extracted in known fashion, (3) the port id., that is, the particular channel or port number in the communications chassis 20 that is associated with the call, and (4) the IP address of the communications chassis 20.

At step 104, the authentication server 32A issues an Access-Reply message to the communications chassis 20. If the user is authorized to access the network serviced by the authentication server 32A, the message includes an identification that PPTP is the proper tunneling protocol, an identification of the tunneling server's IP address, and the port number of the tunneling server to receive the call. If the remote user is not authorized, the procedure set forth in FIG. 8, described below, is used.

Figure 9:
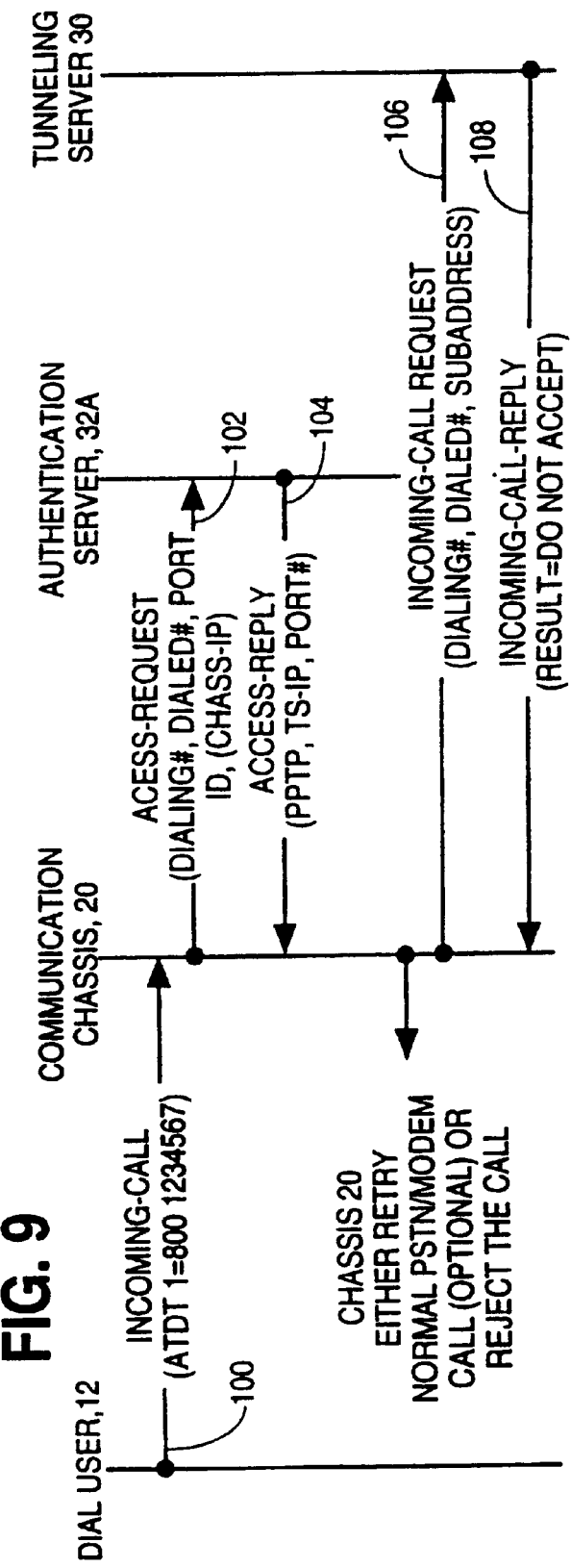
FIG. 9 is a diagram of the call flow for a tunneling server access rejection scenario.

At step 106, the communications chassis 20 sends an Incoming-Call-Request message to the tunneling server 34. The message includes an identification of the dialing number of the remote user, the telephone number dialed, and a subaddress. At step 108, if the tunneling server 34 is able to accept the call, an Incoming-Call-Reply message is sent, such as Connect if the result of the access inquiry is affirmative. If the tunneling server cannot accept the call, the procedure of FIG. 9 is used.

At step 110, if the Connect message was received from the tunneling server 34, the communications chassis 20 sends a call accept message to the remote user over the Frame Relay line FR and wireless network. An incoming call connect message is then relayed at step 112 from the communications chassis 20 to the tunneling server 34.

At step 114, a second phase authentication procedure is preferably (but optionally) implemented. Steps 116, 118, 120, 122, 124 and 126 are self-explanatory from FIG. 6 and are part of the well known PAP and CHAP password authentication protocols, with which those skilled in the art are familiar.

At step 128, assuming the password authentication was successful, a message is sent from the tunneling server 34 to the remote user 12 indicating that a PPP link is established via the communications chassis 20 between the remote user 12 and the tunneling server 34. At this time, transfer of packets of data in accordance with the Internet Protocol between the remote user and the host on the network 22 or 24 is accomplished.

Figure 7:
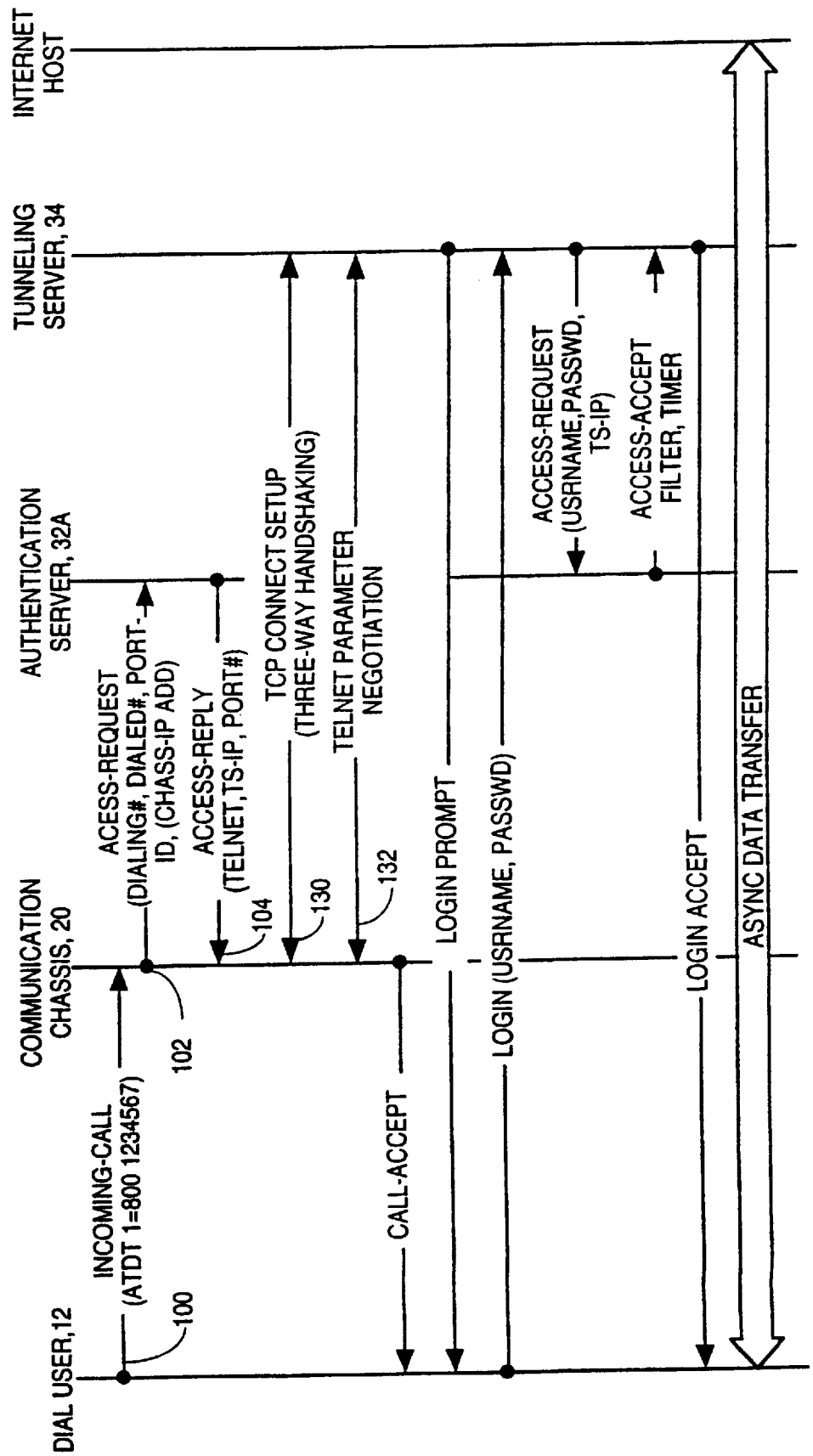
FIG. 7 is a diagram of the call flow for TELNET protocol tunneling for a call acceptance scenario in accordance with a preferred embodiment of the invention.

FIG. 7 is a diagram of the call flow for TELNET protocol tunneling for a call acceptance scenario in accordance with a preferred embodiment of the invention. The process is largely the same as described in FIG. 6, and self-explanatory from the figure. The establishment of a TELNET session requires a handshaking and parameter negotiation between the communications chassis 20 and the tunneling server 34, as indicated in steps 130 and 132. The second phase authentication using login protocols such as PAP is performed as indicated. After the login acceptance message is sent from the tunneling server 34 to the dial user 12, asynchronous data transfer takes place via the communications server 20 and the tunneling server 34 between the remote user 12 and the host on the computer network (e.g., Internet).

Figure 8:
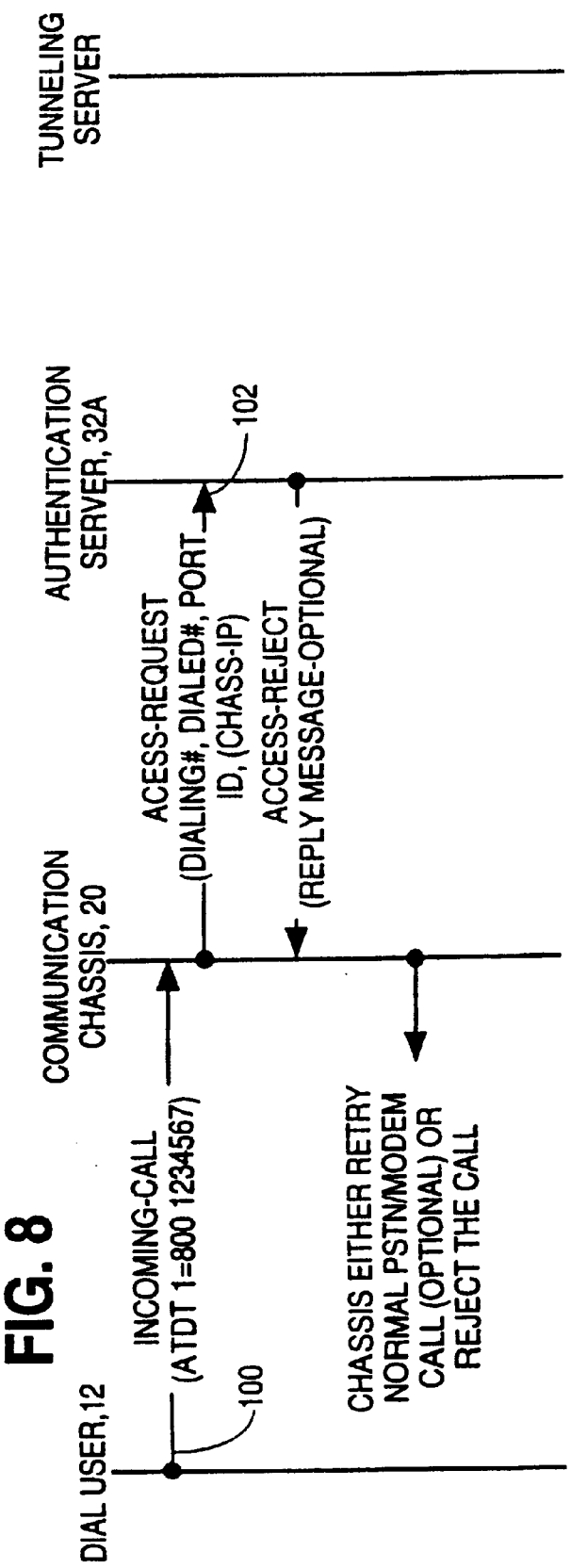
FIG. 8 is a diagram of the call flow for an authentication failure scenario.

It is possible that during the first phase of the access authorization, the authentication server determines that the remote user is not authorized to access the designated network served by the authentication server (due to, for example, the remote user phone number not matching with a data base of Internet customers for the Internet service provider managing the chassis 20). One preferred way of dealing with this scenario is shown in FIG. 8, which is a diagram of the all flow for an authentication failure scenario. When the authentication server 32A determines hat the remote user is not authorized, an Access-Reject message is sent from the authentication server 32 to the communications chassis 20 This message may include a field setting forth the reason why access was denied. Such reasons may include the wrong number was dialed, the ISP does not recognize the user's telephone number, the user is in arrears in paying monthly fees, the authentication server is out of service, etc. The communications chassis 20 then may either send a message to the remote user 12 to either retry later, treat the call as a PSTN/modem call and try to route the call on the PSTN system, or simply reject the call and initiate a disconnect sequence.

There may also be situations where the authentication server 32A approves the access to the network, but the tunneling server 30 or 34 is not able to act as a mechanism for transferring data between the remote user 12 and the target network 22 or 24. FIG. 9 is a diagram of the call flow for a tunneling server access rejection scenario. The first steps 100, 102, 104 and 106 are as described above in FIG. 6. If the tunneling server 34 cannot process the call, the tunneling server 30 or 34 issues an Incoming-Call-Reply to the communications chassis 20 with a message or field indicating that the call should not be accepted. At this point, the communications chassis 20 may either send a message to the remote user 12 to either retry later, treat the call as a PSTN/modem call and try to route the call on the phone system, or simply reject the call.

Figure 10:
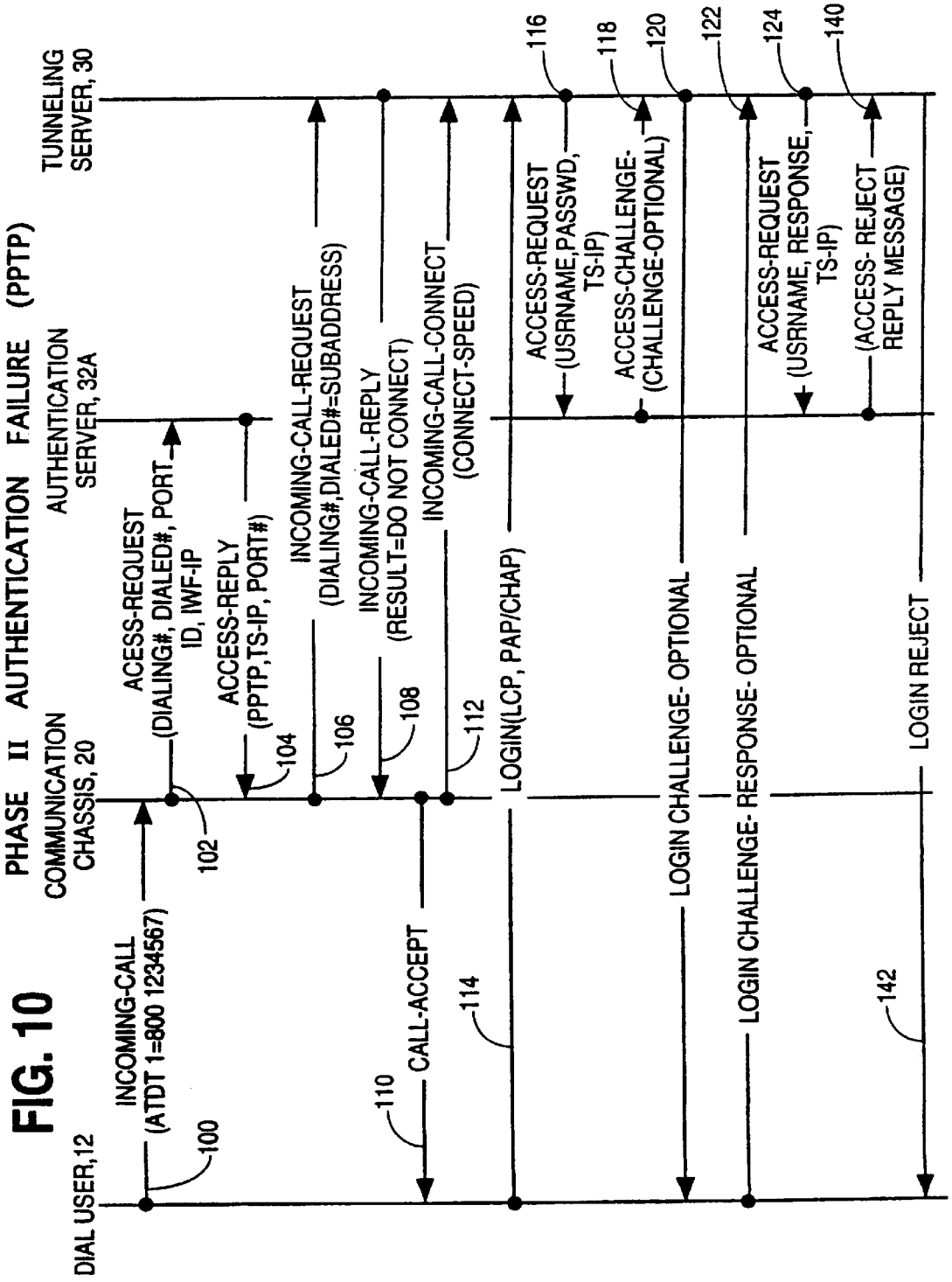
FIG. 10 is a diagram of the call flow for an authentication failure scenario for the PPTP protocol in which a log-in password authentication procedure is performed as a second phase of a network access authentication procedure.

During the second phase authentication procedure mentioned above in connection with FIGS. 6 and 7, the user may fail the password authentication procedure. FIG. 10 is a diagram of the call flow for an authentication failure scenario for the PPTP protocol in which a log-in password authentication procedure is performed as a second phase of a network access authentication procedure. At step 140, an access reject message is sent to the tunneling server 30/34 from the authentication server 32A. At this point (step 142) the tunneling server sends a login reject message to the remote user 12.

Figure 11:
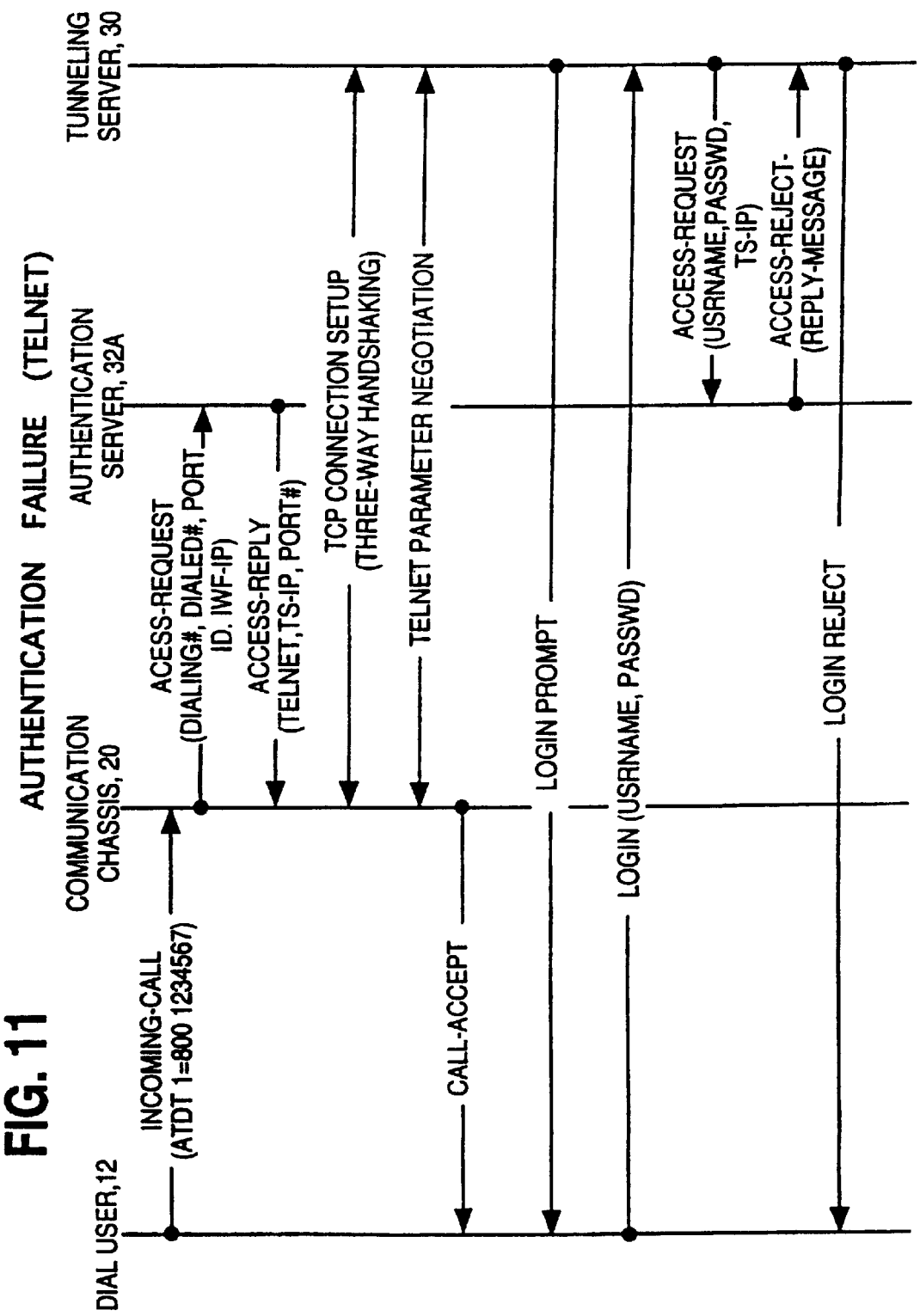
FIG. 11 is a diagram of the call flow for an authentication failure scenario for the TELNET in which a log-in password authentication procedure is performed as a second phase of a network access authentication procedure.

FIG. 11 is a diagram of the call flow for an authentication failure scenario for the TELNET in which a log-in password authentication procedure is performed as a second phase of a network access authentication procedure. The process proceeds essentially as described above.

Still further details on the presently preferred implementation of PPTP and TELNET tunneling, accounting, and phase 1 and phase two authentication, as set forth herein, are described below.

Protocol Interface

The communications chassis 20 interfaces with the Dial-user (wireless terminal), MSC, Router, Authentication Server, and Tunneling Server. This specification is only concerned with the communications chassis interfaces to the Authentication Server and the Tunneling Server. The other interfaces will be apparent to those skilled in the art.

PPTP Tunneling

PPTP tunneling is enabled based on the Login-Service attribute from the RADIUS Access-Reply message during the phase one authentication. If the protocol type has value PPTP (TBD in RFC 2058), a PPTP tunnel will be setup between the communications chassis and the Tunneling Server to tunnel further traffic from the caller.

The communications chassis gateway is equivalent to the PAC (PPTP Access Concentrator) in the PPTP RFC and the Tunneling Server is equivalent to the PNS (PPTP Network Server) in the PPTP RFC. In the following PPTP description, we use the terms PAC and PNS.

For each configured PPTP PAC-PNS pair, the interface between the PAC (communications chassis) and PNS (Tunneling Server) consists of two parallel components:

1. A Control connection operating over TCP.
2. An IP tunnel that transports encapsulated PPP packets for user sessions between the pair.

PPTP Control Connection

Before PPP tunneling can occur between a PAC and PNS, a control connection must be established between them. The control connection is a standard TCP session over which PPTP call control and management information is passed. The control session is logically associated with, but separate from, the sessions being tunneled through a PPTP tunnel.

For each PAC-PNS pair both a tunnel and a control connection exist. The control connection is responsible for establishment, management, and release of sessions carried through the tunnel. It is the means by which a PNS is notified of an incoming call at an associated PAC, as well as the means by which a PAC is instructed to place an outgoing dial call (this scenario is not supported at this time).

The PPTP RFC does not specify when to set up each control connection. This is up to the implementation. To reduce call setup time, the PAC (communications chassis) will establish the control connections at initialization.

PPTP Tunnel Connection

PPTP requires the establishment of a tunnel for each communicating PAC-PNS pair. The tunnel is used to carry all user session PPP packets for sessions involving a given PAC-PNS pair. A key which is present in the GRE header indicates which session a particular PPP packet belongs to. In this manner, PPP packets are multiplexed and de-multiplexed over a single tunnel between a given PAC-PNS pair. The value to use in the key field is established by the call establishment procedure which takes place on the control connection.

PPTP Control Connection Messages

Control Connection Management Messages:
These messages consist of the following messages
Start-Control-Connection-Request
Start-Control-Connection-Reply
Stop-Control-Connection-Request
Stop-Control-Connection-Reply
Echo-Request
Echo-Reply
Call Management Message:
These messages consist of the following messages:
Outgoing-Call-Request (not supported at this time)
Outgoing-Call-Reply (not supported at this time)
Incoming-Call-Request
Incoming-Call-Reply
Incoming-Call-Connected
Call-Clear-Request
Call-Disconnect-Notify
Error Reporting
WAN-Error-Notify
PPP Session Control
Set-Link-Info

PPTP Tunnel Connection Message

PPTP Data PDU:
Each PPP frame is encapsulated in a GRE (Generic Routing Encapsulation Header, described in the Request For Comments (RFC) 1701 (October, 1994), incorporated by reference herein.

Telnet Tunneling

The PPTP and L2TP protocols are not designed to tunnel Asynchronous traffic. A synchronous traffic will be tunneled via the Telnet Protocol (See RFC 854), incorporated by reference herein.

The Telnet implementation must support the Telnet commands and options, such as ECHO, linemode, binary, and SUPPRESS GO AHEAD. The Tunneling Server must be able to request on a given Telnet session a switch from one mode another in the middle of a Telnet connection, such as going from ECHO to NO ECHO, linemode and, subsequently, to binary transmission. In addition, the escape functionality must be disabled in the communications chassis gateway to prevent the dial user from entering local mode on the communications chassis gateway.

Telnet tunneling is enabled based on the Login-Service attribute from the RADIUS Access-Reply message during phase one authentication. If the Login-Service attribute has value Telnet, a Telnet tunnel will be set up between the communications chassis and the Tunneling Server to tunnel further traffic from the caller.

RADIUS Authentication Interface

Two phases of authentication will be used. The first phase of authentication is based on calling number, called number, and communications chassis IP address. The second phase authentication is based on user name, password, and/or challenge/response (optional).

This section specifies both the first phase and the second phase RADIUS authentication exchange. When using one of the tunneling options, the end user authentication will be done by the Tunneling Server during the second phase authentication, which is transparent to the communications chassis. With non-tunneling Internet access, the communications chassis performs both phases of authentication (and may optionally skip the first phase).

The following general operations apply to the RADIUS interface:

1. This document complies with the IETF RADIUS Authentication RFC 2058. The Authentication Server provides the RADIUS server functions specified in the RFC. The communication chassis and Tunneling Server implement the RADIUS client functions.
2. The communications chassis shall be able to associate at least two Authentication Servers with each special Internet access called number. These two (or more) Authentication Servers will provide primary and secondary RADIUS authentication server functions. Each Authentication Server will be identifiable with a configurable server IP address and UDP port. The Internet access called numbers may or may not share Authentication Servers.
3. The RADIUS shared secret (1 to 15 characters) will be configured administratively per server. This specification does not address how shared secrets are managed across communications chassis gateways and RADIUS nodes (Authentication Servers), but such details are within the capability of persons skilled in the art.
4. The communications chassis gateway implements a re-transmit algorithm that allows for Access-Requests to be lost. A configurable re-transmission counter determines when the Authentication Servers are out of Service for a particular Internet access called number, in which case the communications chassis optionally follows standard PSTN/modem access procedures.

Phase 1 Authentication Interface

Access-Request Message:

The RADIUS Access-Request Message will be sent to the RADIUS server (the Authentication Server 32A) by communications chassis 20 to indicate an incoming call. The following list of attributes are sent along with the message:

User-Name: Set to VENDOR-ID for all incoming calls

User-Password: Set to null

NAS-IP-Address: Set to IP address of the communications chassis

NAS-Port: The port number or any other identifier that can be associated with the caller on the communications chassis.

Called-Station-Id: The called number dialed by the user. This will be used to identify the service desired by the caller.

Calling-Station-Id: The caller's number or telephone identifier. This may be used for phase I authentication.

NAS-Port-Type: Specifies the type of port used by the user on the communications chassis switch: (TBD value for wireless access in RFC 2058).

Access-Accept Message

The RADIUS Access-Accept Message is sent by RADIUS (Authentication Server) to the communications chassis 20 to indicate the acceptance of the incoming call for the specific service. The following list of attributes are sent from the Authentication Server to the communications chassis:

Service-Type: Set to 1 (Login) for PPTP or Telnet tunneling. Set to 2 (Framed) for non-tunneling Internet access using PPP.

Login-Service: Set to either 0-Telnet, or TBD-PPTP. Attribute unused if Service-Type attribute set to 2 (Framed).

Login-IP-Host: The IP Address of the Tunneling Server to which the caller should be connected. Attribute unused if Service-Type attribute set to 2 (Framed).

Login-TCP-Port: The TCP port on the Tunneling Server to which the caller should be connected. Attribute unused if Service-Type is set to 2 (Framed).

Reply-Message: Optional, sent only for Telnet users. The communication chassis should forward this attribute as an async string to the remote user before completing the TELNET tunnel to the Tunneling Server.

Framed-Protocol: Set to 1 (PPP) if Service-Type attribute set to 2 (Framed). Attribute is unused if Servive-Type is set to 1 (Login).

Access-Reject Message

The RADIUS Access-Reject message is sent by RADIUS to the communications chassis to deny an incoming call to the specific service. The communications chassis, upon receiving this message, will proceed with normal PSTN/modem procedures. The Communications Chassis should forward an ASCII string message to the user, if the Reply Message attribute is included in the Access-Reject message. The following attribute may optionally be sent from RADIUS to the communications chassis:

Reply-Message: Optional, sent only for Telnet users. The communications chassis should forward the contents of this attribute as an async string to the caller before proceeding with normal PSTN/modem procedures.

Phase II Authentication Interface

This section specifies the phase two authentication messages between a communications chassis and Authentication Server using the non-tunneling Internet access option. It also provides an example of a possible phase two authentication exchange between a Tunneling Server (RADIUS client) and Authentication Server (RADIUS server) based on either of the tunneling options.

Access-Request Message

The RADIUS Access-Request Message will be sent to RADIUS by the communications chassis to indicate an incoming call. The following list of attributes are sent along with the message:

User-Name: This attribute indicates the name of the dial-in user to be authenticated.

User-Password: This attribute indicates the password of the dial-in user to be authenticated, or the user's input following an Access-Challenge.

NAS-IP-Address: Set to IP address of the communications chassis.

NAS-Port: The port number or any other identifier that can be associated with the caller on the communications chassis.

Service-Type: Set to 2 (Framed).

Framed-Protocol: Set to 1 (PPP).

Framed-IP-Address: The dial in user 12 may optionally request the use of its local static configured IP address.

This IP address may be overwritten by the same attribute included in the Access-Accept Message.

Access-Accept Message

The RADIUS Accept Message is sent by RADIUS to the communications chassis to indicate the acceptance of the incoming call for the specific service. The dial-user is also assigned an IP address by this message. The folllowing attribute is sent from RADIUS to the communications chassis:

Framed-IP-Address: This attribute indicates the IP address to be assigned to the user.

Access-Reject Message

The RADIUS Access-Reject message is sent by RADIUS (authentication server) to the communications chassis to deny a specific service to an incoming call. The communications chassis, upon receiving this message, will indicate that the requested service is not available and terminate the user connection.

Access-Challenge Message

The RADIUS Access-Challenge message is optionally sent by RADIUS to the communications chassis to perform challenge/response authentication procedure to RFC 2058.

RADIUS Accounting Interface

Both the communications chassis and the Tunneling Server will implement RADIUS accounting client functions as defined in RFC 2059. If an Accounting Server is associated with the Authentication Server controlling a call, each RADIUS accounting client will send the following RADIUS accounting messages as described in this section.

The accounting clients from the communications chassis and the Tunneling Server will send the accounting Start message upon receiving the Access-Accept message from the RADIUS Authentication Server.

Once a call has been dropped, cleared, or disconnect, the accounting clients will send an accounting Stop message to the RADIUS accounting server.

The accounting Start message is conveyed by the RADIUS Accounting-Request message with Acct-Status-Type value set to 1. The accounting Stop message is conveyed by the RADIUS Accounting-Request message with Acct-Status-Type value set to 2.

Accounting-Request Message

The Accounting-Request packets are sent from the client to RADIUS accounting server and convey information used to provide accounting for a service provided to a user.

The following are part of the accounting related attributes which may be sent along with the message:

Acct-Status-Type: This attribute indicates whether this Accounting-Request marks the beginning of the user service (Start) or the end (Stop).

Acct-Delay-Time: This attribute indicates for how many seconds the client has been trying to send this record, and can be subtracted from the time of arrival on the server to find the approximate time of the event generating this Accounting-Request.

Acct-Input-Octets: This attribute indicates how many octets have been received from the port over the course of this service being provided, and can only be present in Accounting-Request records where the Acct-Status-Type is set to Stop.

Acct-Output-Octets: This attribute indicates how many octets have been sent to the communications chassis in the course of delivering this service, and can only be present in Accounting-Request records where the Acct-Status-Type set to Stop.

Acct-Session-Id: This attribute is a unique Accounting ID to make it easy to match start and stop records in a log file. The start and stop records for a given session must have the same Acct-Session-Id. It is strongly recommended that the Acct-Session-Id be a printable ASCII string.

Acct-Authentic: This attribute may be included in an Accounting-Request to indicate how the user was authenticated, whether by RADIUS, the sender itself, or another remote authentication protocol. Users who are delivered service without being authenticated should not generate Accounting records.

Acct-Session-Time: This attribute indicates for how many seconds the user has received service, and can only be present in Accounting-Request records where the Acct-Status-Type is set to Stop.

Acct-Input-Packets: This attribute indicates how many packets have been received from the port over the course of this service being provided to a Framed User, and can only be present in Accounting-Request records where the Acct-Status-Type is set to Stop.

Acct-Output-Packets: This attribute indicates how many packets have been sent to the port in the course of delivering this service to a Framed User, and can only be present in Accounting-Request records where the Acct-Status-Type is set to Stop.

Acct-Terminate-Cause: This attribute indicates how the session was terminated, and can only be present in Accounting-Request records where the Acct-Status-Type is set to Stop.

Accounting-Response Message

Upon receipt of an Accounting-Request, the RADIUS accounting server must reply with the Accounting-Response message if it successfully records the accounting packet, and must not transmit and reply if it fails to record the accounting packet.

GLOSSARY

Terms and Acronyms

Code Division Multiple Access (CDMA)

A North American Standard for digital voice and data wireless telecommunications in the cellular and PCS spectrum which uses the CDMA technique for multiplexing users on the radio interface.

Internet Protocol (IP)

The Internet Protocol defines an unreliable, connectionless deliver mechanism for user datagrams through the Internet.

IWP-IP

An communications chassis provides the functions needed for terminal equipment connected to a TDMA or CDMA mobile phone to inter-work with terminal equipment connected to the PSTN and Internet networks.

Layer Two Tunneling Protocol (L2TP)

A protocol defined to permit the tunneling of the link layer protocol of PPP. This protocol is in draft RFC form at the present time and is expected to be adopted as a standard Mobile Switching Center (MSC)

A network element within a cellular or PCS wireless telecommunications network that provides PSTN connectivity, control functions, and switching functions for wireless users.

PPTP Access Concentrator (PAC)

A device providing external connectivity (typically via one or more PSTN or ISDN lines), capable of PPP operation and of handling the PPTP protocol. The PAC uses IP to tunnel user traffic to one or more PHSs. It may also tunnel non-IP protocols.

PPTP Network Server (PNS)

A PNS is a communications chassis envisioned to operate on general-purpose computing/server platforms. The PNS handles the server side of the PPTP protocol. Since PPTP relies completely on IP and is independent of the interface hardware, the PNS may use the any combination of IP interface hardware including LAN and WAN devices.

Point-to-Point Tunneling Protocol (PPTP)

A protocol defined to tunnel PPP traffic between PAC and PNS. It uses GRE-like (Generic Routing Encapsulation) mechanism to provide a flow- and congestion-controlled encapsulated datagram service for carrying PPP packets. The protocol also supports a "Tunnel" control and management function to setup and tear down a control connection as well as setup and tear down a data connection. There is one control connection and one data connection for each pair of PAC and PNS.

Public Switched Telephone Network (PSTN)

The land-based telecommunications infrastructure that provides 3 KHz circuit voice server to fixed endpoints throughout the world today.

Remote Authentication Dial In User Service (RADIUS)

RADIUS servers are responsible for receiving user connection requests, authenticating the user, and then returning all configuration information necessary for the client to deliver service to the user. A Radius server can act as a proxy client to other RADIUS servers or other kinds of authentication servers. RADIUS server support PPP PAP or CHAP, UNIX login, and other authentication mechanisms.

TELNET

Telnet was designed to support asynchronous communication between any two network virtual terminals (NVT) over a TCP/IP connection. The NVT is an imaginary device from which both ends of the connection, the client and server, map their real terminal to and from.

Time Division Multiple Access (TDMA)

A North American Standard for digital voice and data wireless telecommunications in the cellular and PCS spectrum which uses the TDMA technique for multiplexing users on the radio interface.

Transport Control Protocol (TCP)

The Transport Control Protocol provides a reliable connection-oriented mechanism for delivery of user data across an IP network.

TS-IP

Tunneling Server IP address

User Datagram Protocol (UDP)

A connection-less oriented protocol built on top of IP. The service access point (SAP) of UDP is identified by a UDP port and the IP address.

Virtual Private Network (VPN)

A secure network built upon Internet to deliver secure information access.

From the foregoing description, it will be appreciated that various modifications and changes may be made to the preferred embodiments disclosed herein, without departure from the true spirit and scope of the invention. This true spirit and scope is set forth in the appended claims, to be interpreted in light of the foregoing.

We claim:

1. A method of connecting a source of digital data to a computer network, the source of digital data communicating over a wireless transmission medium to a wireless service carrier, the wireless service carrier multiplexing said digital data onto a high speed digital telephone line, the method comprising the steps of:

receiving said digital data at a communications device coupling said source of digital data to said computer network, said communications device having a telephone line interface and a local area or wide area packet-switched computer network interface;

said communications device extracting, from said digital data, network access authentication data comprising at least one of the following: (a) a telephone number called by said source of digital data, or (b) a telephone number associated with said source of digital data;

said communications device transmitting said authentication data over said local area or wide area computer network connected to said communications device to a network authentication server for said computer network;

determining, in said network authentication server, from said transmitted authentication data whether said remote user is permitted to access said computer network;

said authentication server responsively notifying said communications device the results of said step of determining and authorizing said source of data to access said computer network if said step of determining results in a positive response.

2. The method of claim 1, wherein said computer network comprises the Internet.

3. The method of claim 1, wherein said computer network comprises a corporate local area or wide area network.

4. The method of claim 1, wherein said communications device provides access to the public switched telephone network and wherein said communications device attempts to route said digital data to a destination for said digital data via said public switched telephone network in the event that said step of determining results in a negative response.

5. The method of claim 1, wherein the method further comprises the steps of:

identifying, in said authentication server, a tunneling server linked to said communications device to be used to provide access for said source of digital data to said computer network; and routing digital data from said source of digital data to said tunneling server to provide said access to said computer network.

6. The method of claim 5, further comprising the steps of:

determining, in said authentication server, a tunneling protocol for said source of digital data for use in tunneling digital data between said network access server and said tunneling server; and routing digital data from said source of digital data to said tunneling server in according to said tunneling protocol.

7. The method of claim 5, wherein said tunneling protocol is selected from the group of protocols comprising PPTP and TELNET.

8. The method of claim 2, further comprising the steps of:
conducting a password authentication routine between either (1) said tunneling server or (2) said authentication server and said source of digital data, thereby providing a second level of authentication between said source of digital data and said computer network.

9. An Internet access method for use by an Internet service provider having a communications device receiving telephone calls from a user over a high speed telephone line, comprising the steps of:
connecting said communications device to an authentication server over a local or wide area packet-switched computer network;
extracting, from an incoming call from said user, network access authentication data comprising at least one of the following: (a) a telephone number called by said user, or (b) a telephone number associated with said user;
routing said network authentication data to said authentication server for authentication of said user from said network access authentication data;
identifying a tunneling server for providing network access for said user and notifying said network access server of said tunneling server;
tunneling digital data from said network access server to said tunneling server; and
placing said digital data onto the Internet by said tunneling server.

10. The method of claim 9, further comprising the steps of:
identifying a tunneling protocol for said user for said step of tunneling.

11. A method of connecting a mobile computer generating digital data to the Internet, the digital data being placed onto a high speed digital telephone line for transmission to an Internet service provider, the method comprising the steps of:
receiving said digital data at a communications device at said Internet service provider,
extracting, from said digital data, Internet access authentication data comprising at least one of the following: (a) a telephone number called by said computer, or (b) a telephone number associated with said computer;
transmitting said authentication data to a network authentication server;
determining, in said network authentication server, from said transmitted authentication data, whether said computer is authorized to access the Internet via said network access server,
said authentication server responsively notifying said network access server the results of said step of determining and authorizing said computer to access the Internet if said step of determining results in a positive response.

12. The method of claim 11, wherein said communications device provides access to the public switched telephone network and wherein said communications device attempts to route said digital data to a destination for said digital data via said public switched telephone network in the event that said step of determining results in a negative response.

13. The method of claim 11, wherein the method further comprises the steps of:
identifying, in said authentication server, a tunneling server to be used to provide access for computer to the Internet; and
routing digital data from said computer to said tunneling server to provide said access to the Internet.

14. The method of claim 13, further comprising the steps of:
conducting a password authentication routine between either (1) said tunneling server or (2) said authentication server and said computer, thereby providing a second level of authentication between said source of digital data and said computer network.

15. The method of claim 12, further comprising the steps of:
determining, in said authentication server, a tunneling protocol for use in tunneling digital data between said network access server and said tunneling server; and
routing digital data from said computer to said tunneling server in according to said tunneling protocol.

16. The method of claim 15, wherein said tunneling protocol is selected from the group of protocols comprising PPTP and TELNET.

17. An Internet service provider system for a wireless Internet user, comprising, in combination:
a network access server comprising a high speed digital telephone line interface receiving calls from said wireless Internet user and an Internet gateway for placing digital data associated with said wireless Internet user onto the Internet;
an Internet access authentication server linked to said network access server via a communications medium and responsive to Internet access authentication data extracted from said digital data associated with said wireless Internet user received by said network access server and transmitted from said network access server to said authentication server;
said authentication server further comprising a memory for determining from said Internet access authentication data whether said wireless Internet user is authorized to access the Internet, said Internet authentication server responsively passing an authentication response to said network access server;
said network access server responsive to said authentication response from said authentication server to either allow said wireless Internet user to access the Internet or to take other action with respect to a call from said wireless Internet user.

18. The Internet service provider system of claim 17, further comprising a second Internet authentication server linked to said network access server over a communications medium and responsive to authentication data from said network access server, and wherein said second Internet authentication server is managed by a second Internet service provider and provides Internet authentication responses for said wireless Internet user to either said network access server or said Internet access authentication server.

* * * * *